United States Patent Office 2,993,476
Patented July 25, 1961

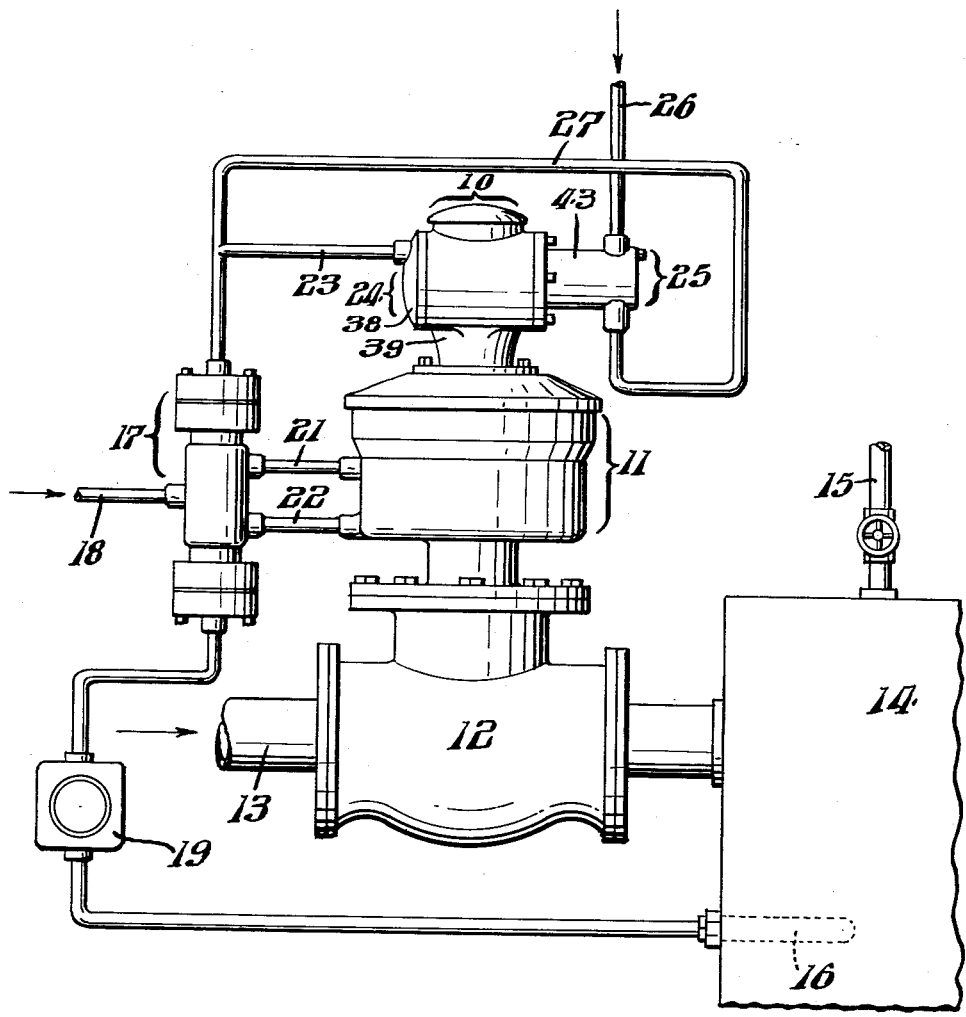

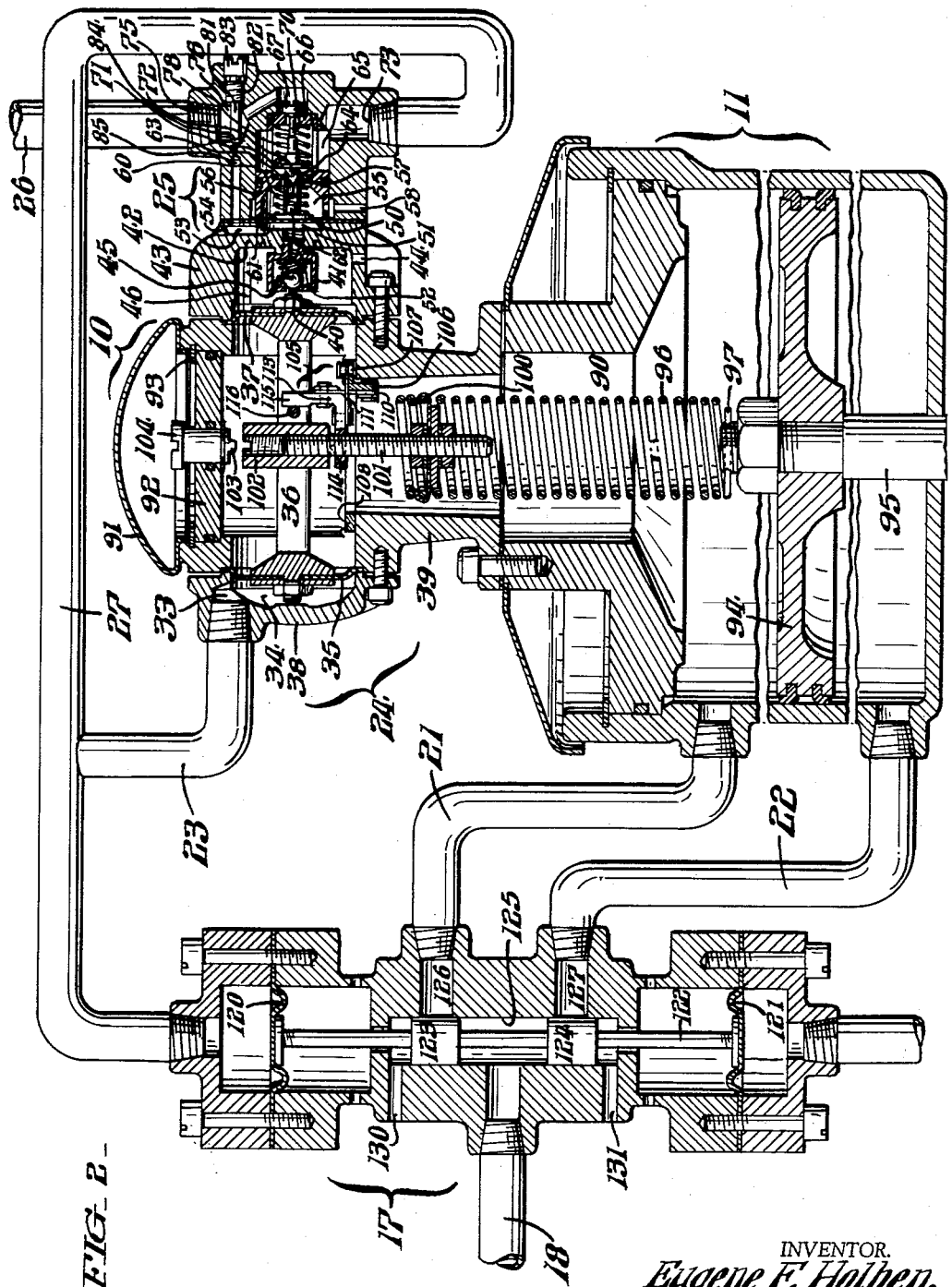

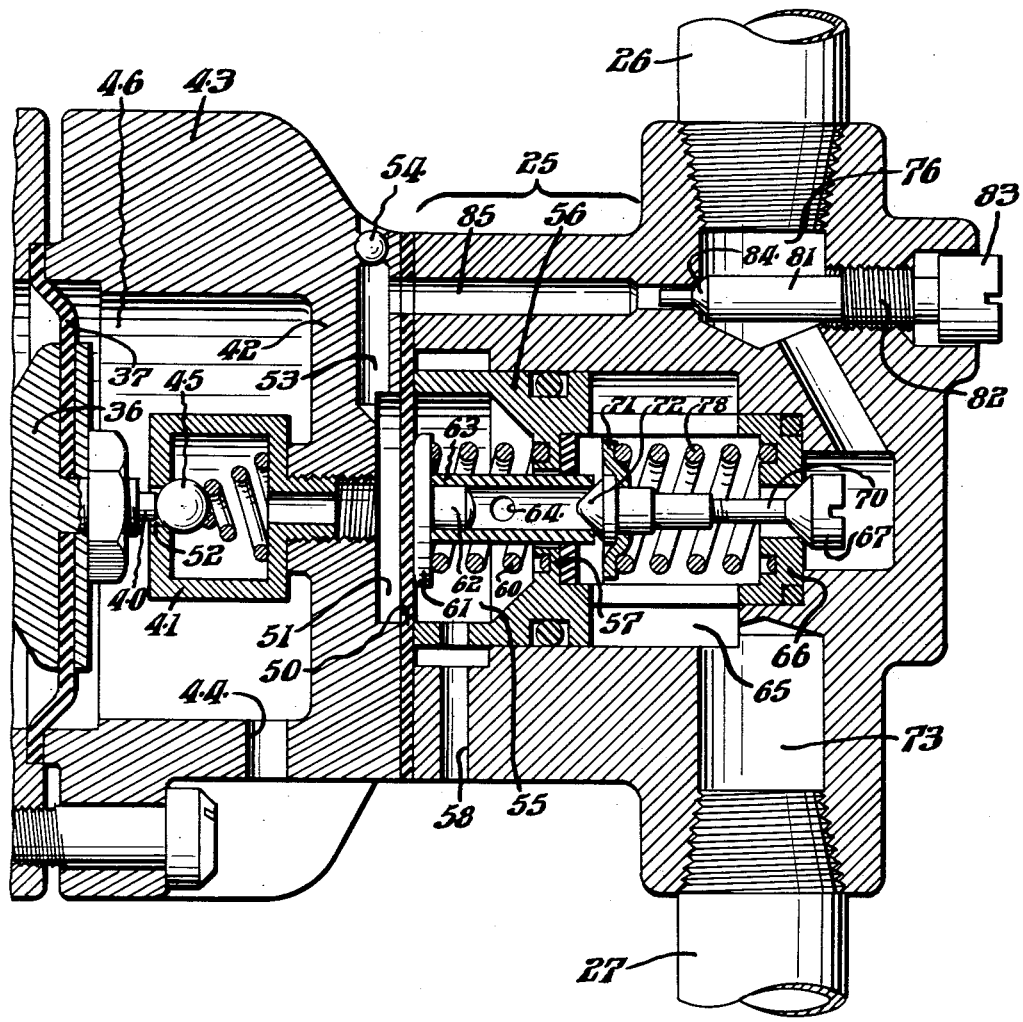

2,993,476
ACTUATOR

Eugene F. Holben, North Wales, Pa., assignor to Conoflow Corporation, Philadelphia, Pa., a corporation of Pennsylvania
Filed Sept. 21, 1959, Ser. No. 841,348
4 Claims. (Cl. 121—41)

This invention relates to a fluid operated actuator, and constitutes an improvement over the actuator disclosed in a co-pending patent application of Warren H. Brand, Serial No. 724,481, filed March 27, 1958.

It is an object of this invention to provide a combined actuating apparatus which utilizes the prinicples and has the advantages of the actuator disclosed in the aforementioned co-pending patent application, and which has additional advantages as well.

It is another object of this invention to provide an actuator which has extremely rapid response to a signal, and which can operate large valves or other devices very rapidly, even when using a signal source of very low intensity. A further object is to provide a system which is exceedingly stable under all conditions of operation.

Another object is to provide an actuating device which has excellent load stiffness—excellent ability to hold its position regardless of load.

Another object is to provide an actuating combination which includes a plurality of components some of which may be located remotely from others.

Other objects and advantages of this invention, including the simplicity and economy of the same and the ease with which it may be incorporated into existing equipment, will further become apparent hereinafter and in the drawings whereof:

FIG. 1 is a diagrammatic view showing the layout of the components of one specific form of actuating apparatus in accordance with this invention.

FIG. 2 is an enlarged view, taken in section, showing the parts which are illustrated in FIG. 1 and the manner in which they are connected and operate.

FIG. 3 is an enlarged detail view of pilot valve 25.

With more specific reference to the drawings, the number 10 designates a position transmitting device connected to a fluid operated actuator 11 which is mounted on a valve 12 for governing the rate of flow of fluid through a pipe 13 into a container 14. Let it be assumed, for example, that a heating medium is fed at a constant rate into the container 14 through a pipe 15 and that the temperature of the contents (as measured by a temperature sensing device 16) rises and falls in response to changes in the rate of fluid flow through pipe 13. As shown, the positioning device 10 is of the construction disclosed in a co-pending U.S. patent application Serial No. 724,481, filed by Warren H. Brand on March 27, 1958.

The controller associated with the positioner 10 is a four-way generally designated 17. The temperature sensing device 16, which may be of any conventional design, is connected to the instrument 19, which in turn is connected to the four-way valve 17 to impress upon the valve 17 a variable pressure which reflects the variations of pressure sensed by the sensing device 16.

As appears in FIG. 1, a supply line 18 from a source of fluid under pressure is connected into the four-way valve 17, and connecting lines 21, 22 extend from valve 17 to the actuator 11. An air supply line 26 is connected into a pilot valve 25, and a return line 27 extends from the pilot valve 25 back to the four-way valve 17, for a purpose further to be explained hereinafter. A line 23 extends from the line 27 to the main body 24 of the positioning device 10.

Referring now to the specific form of the apparatus as shown in FIG. 2 of the drawings, the pressure line 23 communicates through an opening 33 formed in an input chamber cover 38 into an input chamber 34 provided with a pressure sealed diaphragm 35 which is attached at its center to one end of a yoke 36. Yoke 36 is connected at its other end to a diaphragm 37 also sealed to the main body 24. The input chamber cover 38 is removably connected and sealed to the body portion 39 of the main body 24.

The diaphragm 37, on the pilot valve side of the main body 24, carries a flapper valve pin 40 arranged to reciprocate toward and away from a ball 45 encased in a nozzle 41 which is threaded into a dividing wall fixed to the casing 43 of the pilot valve 25. The ball 45 is spring-urged toward the pin 40. Wall 42 and diaphragm 37 cooperate to form a chamber 46. The casing 43 has a large diameter vent opening 44 directly communicating with the atmosphere.

The casing 43 of the pilot valve 25 is removably connected and sealed to the body portion 39 of the main body 24 at a position opposite to that of the input chamber cover 38. This is an important and advantageous feature of the invention, as will further become apparent hereinafter.

Extending across the casing 43, at a location axially spaced from the diaphragm 37, is a diaphragm 50 forming a chamber 51 which is in fluid communication with the bore 52 of nozzle 41 and also with a radially extending passage 53 which has a ball-type seal 54 sealing passage 53 from the atmosphere.

Diaphragm 50 also forms, on its opposite face, a chamber 55 having an exhaust vent 58. Located in chamber 55 is a fixed cylinder 56 having an inwardly extending flange 57 against which one end of an axially arranged helical compression spring 60 bears. The other end of spring 60 bears upon a disc 61 on the diaphragm 50. Disc 61 carries a pin 62 extending into the end of an axially arranged tube 63 extending freely through the central opening in the flange 57. Tube 63 has a hole 64 providing for pressure communication between the chamber 55 and the bore of the tube 63.

Adjacent the chamber 55 is a chamber 65 in which is housed a transversely arranged valve seat 66 coacting with a valve 67 having an axially extending valve stem 70. At its opposite end the stem 70 carries a disc 71 and a nose piece 72 extending into and seating upon the corresponding end of tube 63. A helical compression spring 78 bears upon the disc 71 and upon the shoulder of valve seat 66, normally urging the nose piece 72 toward the end of tube 63.

The chamber 65 is connected, by way of opening 73, into feedback pressure pipe 27, which applies said pressure to capsule plate 35 comprising a part of chamber 34.

Arranged across the passage 76 is a pressure reducing valve having a stem 81 having a threaded portion 82 and an exposed notched head 83 accessible for ready adjustment. A valve seat 84 cooperating with the valve 81 communicates with a passage 85 formed adjacent the edge of the pilot valve body, such passage communicating with the passage 53 extending to the chamber 51, the diaphragm 50 being cut away in the region of the passage 85. The valve 81, 84 reduces the pressure of the incoming fluid maintaining substantially constant flow.

The upper end of the main body 24 is sealed, and is provided with removable cap 91 and a sealed closure disc 92 held in position by a snap ring 93.

At the lower end of the chamber 90, the pressure fluid confined therein bears upon the surface of an actuating means in the form of a piston 94 connected to a shaft 95, the movement of which is controlled in accordance with this invention. The shaft 95 is, for example, a valve stem connected to the valve gate of the valve 12 shown in FIG. 1. The pressure from line 22 bears upon the bottom surface of piston 94, and acts in an opposed direction to the pressure in chamber 90.

At the end of the shaft 95, the end 97 of a helical range spring 96 extends through a corresponding bore in the shaft 95. The range spring 96 extends along the chamber 90, substantially coaxially with the shaft 95, and at substantially right angles to the yoke 36.

A disc 100 is arranged and adjustably affixed transversely of the range spring 96. Disc 100 is adjustable along the length of range spring 96, changing the number of working coils, thereby giving continuous span adjustment. Disc 100 is threadedly connected to an elongated threaded rod 101 carrying an enlarged, threaded sleeve 102 at a location spaced from the range spring 96. The sleeve 102 is adjustable in position along the threaded rod 101, and is notched at its end to correspond to the the key portion 103 of a zero adjusting piece 104 carried on the sealed closure disc 92.

Fixed within the body portion 39, in the chamber 90, and coacting with the threaded sleeve 102, is a flexure strip structure 105. This structure comprises an angle iron 106 secured at 107 to a ring 108 on the body portion 39, to which is secured a flexure strip 110 normally substantially parallel to the axis of range spring 96, and another flexure strip 111 normally substantially perpendicular to flexure strip 110. The flexure strips are cut away to slightly less than about one-half their width at the location of their intersection, providing clearance between the flexure strips.

Flexure strips 110, 111 are secured respectively to the legs of another angle iron 113, one leg 114 of which is provided with an opening through which the threaded rod 101 extends, and the other leg 115 extending to a location adjacent an elongated pin 116 carried by the yoke 36.

The four-way valve 17 has opposed sealed diaphragms 120, 121 at opposite ends. Extending between the diaphragms 120, 121 is a rigid rod 122 carrying valve members 123, 124 which are snugly contained in a cylindrical bore 125. Passages 126, 127 are provided communicating with the central bore 125 and also respectively with pipes 21, 22. Four-way valve 17 also has vent passages 130, 131.

Accordingly, it will be appreciated that the movement of the rod 122 alternately opens lines 21 and 22 to the supply line 18, providing full fluid flow to or from the actuator 11.

In operation, the apparatus shown in FIGS. 1–2 automatically governs the desired movements of the shaft 95 in response to variations of the signal received from the temperature sensing device 16, or any other variable. Assuming a change of the variable causes an increase of fluid pressure from instrument 19, shaft 122 moves immediately toward the diaphragm 120, completely opening port 126 while also opening port 127. Fluid flows at a substantial rate into the upper chamber in actuator 11, urging piston 94 downwardly, and fluid flows out through ports 127 and 131. This stretches range spring 96, moving yoke pin 116 to the left. This causes yoke 36 to move toward the left, in opposition to the pressure in the chamber 34, drawing flapper valve pin 40 away from nozzle 41, allowing ball 45 to close bore 52 of nozzles 41, thus preventing the escape of fluid from chamber 51 to the atmosphere which would otherwise occur by way of nozzle 41, chamber 46 and vent 44. This increases the pressure in chamber 51, since chamber 51 communicates with air pressure supply line 26 by way of passages 53 and 85. The increase in pressure in chamber 51 moves diaphragm 50 to the right and this moves the valve 67 toward its open position opposing the influence of its spring 78. This causes an increase of pressure in the feedback line 27, balancing the pressure upon diaphragm 120 with the pressure on diaphragm 121, closing both ports 126, 127. At the same time, the increased pressure in line 23 against capsule plate 35 is balanced by the force in yoke member 36 caused by increased tension in the spring 96. The shaft 95 therefore becomes stationary.

Accordingly, in response to a change of pressure at the instrument 19, due to a change of the variable under control, the apparatus quickly and positively moves the controlled member 95 through an increment which may be small or large and shuts itself off, awaiting a further signal so that it can again control the movement of the member 95 in the proper direction and in an appropriate amount.

When the pressure from instrument 19 decreases, the rod 122 is moved toward diaphragm 121, introducing pressurized fluid through port 127 into the space below the piston 94, moving piston 94 upwardly. Thus, the range spring 96 relaxes and the pressure in line 23, shifts yoke 36 to the right, opening nozzle 41, decreasing the pressure in chamber 51, and valve 67 is moved toward its closed position. This reduces the pressure in feedback line 27, again balancing the pressures on the diaphragms 120, 121. Reduced tension in spring 96, operating though yoke member 36, now balances the lower force caused by reduced pressure in line 23 against capsule plate 35. (It will be understood that pressure is exhausted from chamber 34 to atmosphere by way of connections 23 and 27, chamber 65, tube 63, hole 64, chamber 55 and vent 58.)

The valve comprising tube 63 and nose piece 72 is provided such that, when pressure in chamber 51 is low, and valve 67 closed, the spring 60 overbalances such pressure, pushing tube 63 to the left. Since valve 67 is stopped against its seat, nose piece 72 cannot move to the left, and the end of tube 63 is separated from it, exhausting pressure fluid out of chamber 65, tube 63, hole 64, chamber 55 and exhaust vent 58.

It will further be appreciated that some of the parts of the apparatus may be located remotely from others. For example, the four-way valve 17 may be placed in any desired position or location and merely connected by means of the pressure lines 27, 21, 22, 18 as indicated herein.

The system described and shown in the drawings can readily be designed to be inherently a stable one, because of the piston overlap in the four-way valve 17. It will be seen that the pistons 123, 124 overlap their ports 126, 127, this being an important and advantageous feature of this invention.

It will further be appreciated that it is possible to obtain great speed of movement of the shaft 95, even when very small signal sources are available. A very small change of instrument pressure from the instrument 19 causes an immediate large movement of the rod 122, completely opening one or the other of the ports 126, 127. By merely providing a sufficiently large and high-pressure source of the fluid in the pipe 18, a tremendous fluid flow can be obtained which actuates the piston 94 and shaft 95 immediately, quickly and positively.

Although the actuator is preferably operated by air, other fluids, either liquid or gaseous, may be substituted. The fluid introduced through line 18 may be oil, air or any other compressible or incompressible fluid. The device may be connected to control variables of many different types other than the temperature variable referred to in the drawings and in the foregoing description. It may control the position of any movable element, and is not restricted in its scope to the control of a valve.

Moreover, it will readily be appreciated that the position controller in accordance with this invention is not limited in its application to the control of a piston 94 and valve 95 as heretofore described, but may readily be connected to control any suitable fluid operated actuator, or even other actuators which may be connected to move in response to the movement produced by variations of pressure.

Although this invention has been described in connection with a specific embodiment thereof, reference having been made to certain modifications, it will be appreciated that various modifications may be made, including the substitution of equivalent elements for those specifically shown and described, reversals of parts, and the use of certain features without the use of other features, all without departing from the spirit and scope of the invention as defined in the appended claims.

Having thus described my invention, I claim:

1. In an apparatus which is responsive to an input signal to move a movable member in response to said signal, the combination comprising an actuator connected to move said movable member; said actuator including means forming an enclosed chamber including a pair of aligned and opposed flexible sealing diaphragms, of equal size and shape, feedback means external of said chamber for exerting on one of said flexible diaphragms a pressure varying with the movement of said movable member, rigid means in said chamber connecting said flexible diaphragms for movement in unison, actuating means responsive to applied fluid pressure and connected to move said movable member, a pilot valve connected to the other of said flexible sealing diaphragms and to said external feedback means, and a mechanical connection including a linkage extending from said movable member to said rigid means for displacing said rigid means in response to movement of said movable member to stop said movement; fluid pressure means connected to apply fluid pressure to said actuating means for moving said movable member; control valve means connected to said fluid pressure means for selectively controlling the direction of movement of said movable member; said control valve means having a pair of opposed actuating diaphragms; means for connecting said input signal to actuate one of said valve diaphragms; and connecting means providing a pressure that is responsive to the movement of said actuating means; said connecting means extending from said feedback means to the other of said valve diaphragms.

2. In an apparatus which is responsive to an input signal to move a movable member in response to said signal, the combination comprising an actuator connected to move said movable member; said actuator including means forming an enclosed pressure chamber including a pair of opposed flexible sealing members, feedback means external of said chamber including a pilot valve for controlling fluid pressure from a source for exerting on the outside of one of said flexible members a pressure which varies with the movement of said movable member, a rigid means in said chamber connecting said flexible members for movement in unison with one another, actuating means responsive to fluid pressure and connected to move said movable member, and a mechanical connection including a linkage extending from said movable member to said rigid means for displacing said rigid means in response to movement of said movable member to stop said movement; fluid pressure means connected to said actuating means for moving said movable member; control valve means connected to said fluid pressure means for selectively controlling the direction of movement of said movable member; said control valve means having a pair of opposed actuating diaphragms; means for connecting said input signal to actuate one of said diaphragms; and connecting means providing a pressure that is responsive to the movement of said actuating means; said connecting means extending from said feedback means to the other of said opposed actuating diaphragms.

3. In an apparatus which is responsive to an input signal to move a movable member in response to said signal, the combination comprising an actuator connected to move said movable member, said actuator including actuating means for said movable member and a balanced-pressure positioner having a pair of opposed diaphragms one of which is a pressure-balancing diaphragm, the other of which is a feedback diaphragm, means forming a feedback chamber adjacent said feedback diaphragm, said diaphragms being joined by a rigid member, fluid pressure means connected to said actuating means for moving said movable member, control valve means connected between said fluid pressure means and said actuating means for selectively controlling the movement of said movable member in different directions, said control valve means having a pair of opposed actuating diaphragms, means for connecting said input signal to actuate one of said valve diaphragms, feedback connecting means providing a pressure that is proportional to the movement of said movable member, said feedback connecting means extending from the feedback chamber of said positioner to the other of said diaphragms of said valve means and also to the input diaphragm of said positioner.

4. A positioning device comprising, in combination, a fluid pressure control actuator and a control valve for said actuator; said control valve having two diaphragms connected by a valve rod; said actuator including a chamber having axially aligned opposed diaphragms sealing said chamber, a rigid member within said chamber connecting said diaphragms, a positioning piston in said chamber movable along an axis substantially perpendicular to said rigid member, a pilot valve coupled to the external surface of one of said diaphragms and responsive to movement thereof in a direction coaxial with the axis of said rigid member for controlling the application of a supply fluid pressure, and mechanical means, including resilient means having an axis coaxial with that of said piston and perpendicular to that of said rigid member, for connecting said piston to said rigid member in such manner that said resilient means in response to movement of said piston alters the position of said rigid member on its own axis; means for fluid coupling said control valve to both faces of said piston, means for connecting said control valve to a supply of pressure fluid, means for connecting a signal pressure to one diaphragm of said control valve for controlling selectively the application of supply fluid pressure to one or the other face of said piston for moving said piston in one direction or the other, and feedback means connected from said pilot valve to the other diaphragm of said control valve and also to the other diaphragm of said actuator for repositioning the valve rod of said control valve and the rigid member of said actuator in response to movements of said piston.

References Cited in the file of this patent

UNITED STATES PATENTS

| | | |
|---|---|---|
| 2,411,748 | Kelley | Nov. 26, 1946 |
| 2,484,557 | Eckman | Oct. 11, 1949 |
| 2,536,184 | Johnson | Jan. 2, 1951 |
| 2,588,621 | Eckman | Mar. 11, 1952 |
| 2,588,622 | Eckman | Mar. 11, 1952 |
| 2,637,301 | Burdick | May 5, 1953 |